United States Patent
Fang et al.

(10) Patent No.: US 9,494,820 B2
(45) Date of Patent: Nov. 15, 2016

(54) GLOSSY DISPLAY SUBSTRATE AND GLOSSY DISPLAY APPARATUS

(71) Applicant: BOE TECHNOLOGY GROUP CO., LTD., Beijing (CN)

(72) Inventors: Zheng Fang, Beijing (CN); Hyunsic Choi, Beijing (CN); Hui Li, Beijing (CN); Yunyun Tian, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 10 days.

(21) Appl. No.: 14/568,837

(22) Filed: Dec. 12, 2014

(65) Prior Publication Data
US 2015/0346549 A1 Dec. 3, 2015

(30) Foreign Application Priority Data
May 30, 2014 (CN) .................... 2014 2 0287669 U

(51) Int. Cl.
| G02F 1/03 | (2006.01) |
| G02F 1/1335 | (2006.01) |
| G02F 1/01 | (2006.01) |
| G02B 27/01 | (2006.01) |
| G02F 1/133 | (2006.01) |
| G02F 1/1368 | (2006.01) |
| G02F 1/1343 | (2006.01) |

(52) U.S. Cl.
CPC ..... *G02F 1/133555* (2013.01); *G02B 27/0101* (2013.01); *G02F 1/0136* (2013.01); *G02F 1/1368* (2013.01); *G02F 1/13306* (2013.01); *G02F 1/133512* (2013.01); *G02F 1/133514* (2013.01); *G02F 1/133536* (2013.01); *G02F 1/134363* (2013.01); *G02F 2001/133626* (2013.01); *G02F 2001/134318* (2013.01); *G02F 2001/134345* (2013.01)

(58) Field of Classification Search
CPC .................. G02F 1/133555; G02F 1/333514; G02F 1/133536; G02F 1/0136; G02F 1/1368; G02F 1/13306; G02B 27/0101
USPC ........... 359/247, 228, 296, 265–275; 345/90, 345/92, 105, 107
See application file for complete search history.

(56) References Cited

U.S. PATENT DOCUMENTS

| 8,014,054 B2 * | 9/2011 | Lo .................. G02B 26/005 359/245 |
| 2012/0287377 A1 * | 11/2012 | Kim .................. G02F 1/133555 349/88 |

* cited by examiner

*Primary Examiner* — Tuyen Tra
(74) *Attorney, Agent, or Firm* — Nath, Goldberg & Meyer; Joshua B. Goldberg

(57) ABSTRACT

The present invention discloses a glossy display substrate and a glossy display apparatus. Reflective area and transmissive area are formed on the glossy display substrate. The glossy display substrate comprises an underlayer as well as a first control unit, a reflection layer and a second control unit arranged above the underlayer. The first control unit and the reflection layer are arranged in the reflective area, and the second control unit is arranged in the transmissive area.

18 Claims, 6 Drawing Sheets

GLOSSY DISPLAY SUBSTRATE AND GLOSSY DISPLAY APPARATUS

FIELD OF THE INVENTION

The present invention relates to the field of display technology, and in particular to a glossy display substrate and a glossy display apparatus.

BACKGROUND OF THE INVENTION

With the development of thin-film transistor liquid crystal displays (TFT-LCD), liquid crystal displays are widely applied to various fields. Glossy display is a novel display technology appearing in recent years. An existing glossy display panel is configured such that a transflective film is arranged on a liquid crystal display panel, and thus a user may view the image displayed by the display panel while using the display panel as a mirror.

In the prior art, the glossy display panel is mainly implemented by attaching a transflective polyethylene glycol terephthalate (PET) film or sputtering a transflective metal film onto a light-exiting side of the liquid crystal display panel. In this way, the user has to passively use the display panel as a mirror surface while the image is displayed, that is, the normally-displayed image and the image resulting from specular reflection are seen simultaneously. However, the image resulting from specular reflection may lower the contrast of the normally-displayed image, thus worsening the display effect. In particular, the influence is more obvious in case of bright ambient light from outside (for example, a fluorescent lamp).

SUMMARY OF THE INVENTION

The present invention provides a glossy display substrate and a glossy display apparatus, which are used for improving the display effect.

According to one aspect of the present invention, a glossy display substrate is provided, which is arranged on a backlight source and divided into a reflective area and a transmissive area, the glossy display substrate comprises an underlayer as well as a first control unit, a reflection layer and a second control unit arranged above the underlayer, the first control unit and the reflection layer are arranged in the reflective area, and the second control unit is arranged in the transmissive area. The reflection layer is used for reflecting incident light to generate reflected light. The first control unit is used for controlling a polarization direction of the reflected light so as to prevent the reflected light from exiting from the reflective area under a first display mode, and allow the reflected light to exit from the reflective area under a second display mode. The second control unit is used for controlling a polarization direction of light emitted from the backlight source so as to prevent the light emitted from the backlight source from exiting from the transmissive area under the second display mode, and allow the light emitted from the backlight source to exit from the transmissive area under the first display mode.

According to an embodiment of the present invention, the glossy display substrate may further comprise common electrodes formed above the underlayer.

According to an embodiment of the present invention, the first control unit may comprise a first thin film transistor and a first pixel electrode connected with the first thin film transistor. Under the first display mode, the first thin film transistor is switched on, and a first voltage is applied on the first pixel electrode so as to form a first electric field between the first pixel electrode and the common electrodes; and under the second display mode, the first thin film transistor is switched off.

According to an embodiment of the present invention, the second control unit may comprise a second thin film transistor and a second pixel electrode connected with the second thin film transistor. Under the first display mode, the second thin film transistor is switched on, and a second voltage is applied on the second pixel electrode so as to form a second electric field between the second pixel electrode and the common electrodes; and under the second display mode, the second thin film transistor is switched off.

According to an embodiment of the present invention, the reflection layer may be arranged on the underlayer, and the first control unit may be arranged above the reflection layer. Alternatively, the first control unit may be arranged on the underlayer, and the reflection layer may be arranged above the first control unit. Alternatively, the reflection layer and the first control unit may be arranged at different sides of the underlayer respectively.

According to an embodiment of the present invention, a thickness of the reflection layer may be in a range from 40 nm to 300 nm.

According to an embodiment of the present invention, the glossy display substrate may further comprise a black matrix pattern arranged in the reflective area and the transmissive area, and a color matrix pattern arranged in the transmissive area.

According to another aspect of the present invention, a glossy display apparatus is provided, which comprises a glossy display substrate and an opposite substrate which are oppositely arranged. The glossy display substrate comprises the glossy display substrate according to the concept of the present invention.

According to an embodiment of the present invention, when the glossy display substrate comprises no black matrix pattern and no color matrix pattern, a black matrix pattern may be arranged on areas of the opposite substrate corresponding to the reflective area and the transmissive area of the glossy display substrate, and a color matrix pattern may be arranged on the area of the opposite substrate corresponding to the transmissive area of the glossy display substrate. When the glossy display substrate comprises the black matrix pattern and the color matrix pattern, the opposite substrate may be a transparent substrate.

According to the glossy display substrate and the glossy display apparatus provided by the present invention, the glossy display substrate is divided into the reflective area in which the reflection layer is arranged and the transmissive area. The polarization of light in the reflective area and the transmissive area is controlled by the first control unit and the second control unit which are arranged in the reflective area and the transmissive area respectively, and as a result, the normally-displayed image and the reflected image can not be seen simultaneously any more, thus avoiding the influence of the image resulting from specular reflection on the normally-displayed image, and then improving the display effect.

DETAILED DESCRIPTION OF THE EMBODIMENTS

In order to enable a person skilled in the art to better understand the technical solutions of the present invention, a glossy display substrate and a glossy display apparatus provided by the present invention are described in detail below in combination with the accompanying drawings.

Figure 1:
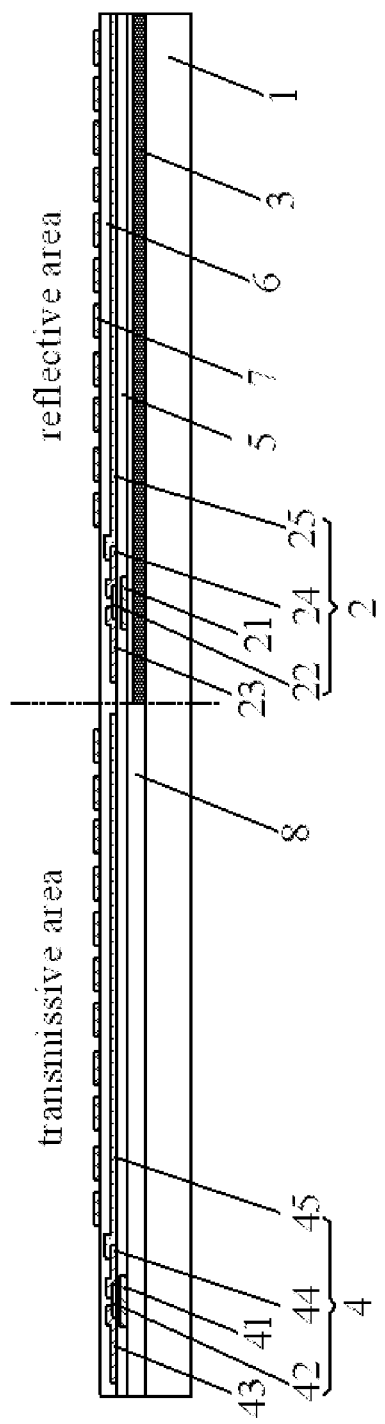
FIG. 1 is a schematic diagram of a structure of a glossy display substrate according to an embodiment of the present invention.
Figure 2:
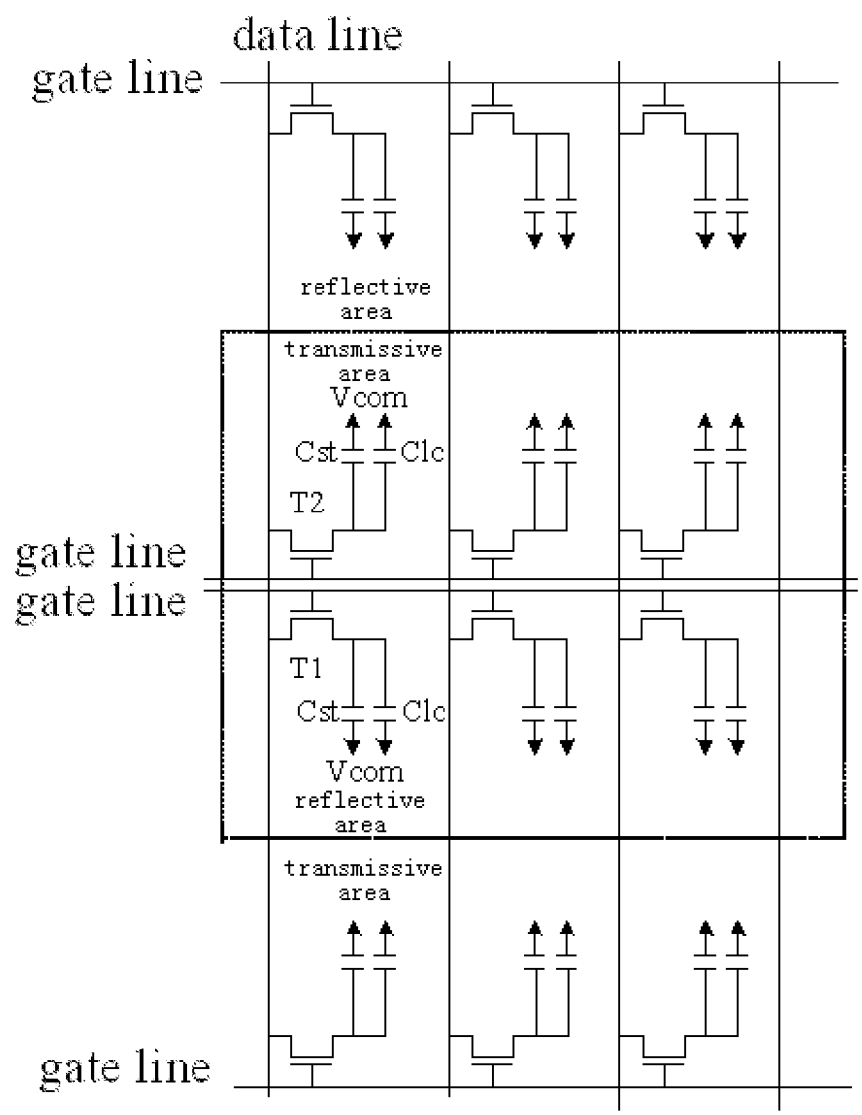
FIG. 2 is an equivalent circuit diagram of the glossy display substrate according to an embodiment of the present invention.

FIG. 1 is a schematic diagram of a structure of a glossy display substrate according to an embodiment of the present invention, and FIG. 2 is an equivalent circuit diagram of the glossy display substrate according to an embodiment of the present invention.

As shown in FIG. 1, the glossy display substrate is divided into a reflective area and a transmissive area, and the glossy display substrate comprises an underlayer 1 as well as a first control unit 2, a reflection layer 3 and a second control unit 4 arranged above the underlayer 1. The first control unit 2 and the reflection layer 3 are arranged in the reflective area, and the second control unit 4 is arranged in the transmissive area. The reflection layer 3 is used for reflecting incident light so as to generate reflected light. The first control unit 2 is used for controlling the polarization direction of the reflected light so as to prevent the reflected light from exiting from the reflective area under a first display mode, and allow the reflected light to exit from the reflective area under a second display mode. The second control unit 4 is used for controlling the polarization direction of the light emitted from a backlight source (not shown in the figure) so as to prevent the light emitted from the backlight source from exiting from the transmissive area under the second display mode, and allow the light emitted from the backlight source to exit from the transmissive area under the first display mode. The incident light is mainly ambient light from outside. The first display mode is a mode of normally displaying an image, and the second display mode is a mode of using the display panel as a mirror surface for displaying the reflected image.

Specifically, the first control unit 2 may comprise a first thin film transistor T1 (see FIG. 2) and a first pixel electrode 25 connected with the first thin film transistor T1. The second control unit 4 may comprise a second thin film transistor T2 (see FIG. 2) and a second pixel electrode 45 connected with the second thin film transistor T2. The first thin film transistor T1 may comprise a gate 21, an active layer 22, a source 23 and a drain 24. The second thin film transistor T2 may comprise a gate 41, an active layer 42, a source 43 and a drain 44. With regard to a bottom-gate type TFT, a first insulation layer 5 covering the whole underlayer 1 may be formed on the gate 21 of the first thin film transistor T1 and the gate 41 of the second thin film transistor T2, and the active layer 22, the source 23 and the drain 24 of the first thin film transistor T1, the active layer 42, the source 43 and the drain 44 of the second thin film transistor T2, the first pixel electrode 25 and the second pixel electrode 45 are formed on the first insulation layer 5 (as shown in FIG. 1). With regard to a top-gate type TFT, the formation positions of the gate 21 and the gate 41 of the first thin film transistor T1 and the second thin film transistor T2, and the formation positions of the other components may be correspondingly changed.

In addition, the glossy display substrate may further comprise a second insulation layer 6 covering the first control unit 2 and the second control unit 4, and common electrodes 7 formed on the second insulation layer 6.

As shown in FIG. 2, two rows of gate lines are adjacently arranged, and the gate lines and data lines intersect to define a plurality of pixel units. Two thin film transistors T1 and T2, and two pixel electrodes respectively corresponding to the thin film transistors T1 and T2 are arranged in each pixel unit. That is to say, each pixel unit is divided into a reflective area and a transmissive area. As shown in a dotted box in FIG. 2, in the embodiment, the transmissive area in one pixel unit is combined with the reflective area in another pixel unit which is adjacent to the one pixel unit to form a display combination. A storage capacitor Cst and a liquid crystal capacitor Clc which are connected in parallel are formed between the pixel electrode in the reflective area and a common electrode Vcom, and a storage capacitor Cst and a liquid crystal capacitor Clc which are connected in parallel are formed between the pixel electrode in the transmissive area and the common electrode Vcom.

Referring to FIGS. 1 and 2, the gate 21 of the first thin film transistor T1 and the gate 41 of the second thin film transistor T2 are connected with the gate lines respectively, the source 21 of the first thin film transistor T1 and the source 41 of the second thin film transistor T2 are connected with the data lines respectively, and moreover, the drain 23 of the first thin film transistor T1 and the drain 43 of the second thin film transistor T2 are connected with the first pixel electrode 25 and the second pixel electrode 45 respectively.

Under the first display mode (that is, the mode of normally displaying the image), the first thin film transistor T1 is switched on through a gate line, and a first voltage obtained from a data line is applied on the first pixel electrode 25 so as to form a first electric field between the first pixel electrode 25 and the common electrodes 7. The first electric field is capable of controlling the polarization direction of the reflected light generated by the reflection layer 3. In addition, under the first display mode, the second thin film transistor T2 is switched on through a gate line, and a second voltage obtained from a data line is applied on the second pixel electrode 45 so as to form a second electric field between the second pixel electrode 45 and the common electrodes 7. The second electric field is capable of controlling the polarization direction of the light emitted from the backlight source.

Under the second display mode (that is, a display mode of using the display panel as the mirror surface), the first thin film transistor T1 is switched off through a gate line, and the second thin film transistor T2 is switched off through a gate line.

As shown in FIG. 1, the reflection layer 3 is arranged on the underlayer 1, and the first control unit 2 is arranged above the reflection layer 3. A third insulation layer 8 covering the whole underlayer 1 is also arranged above the reflection layer 3, and the first control unit 2 and the second control unit 4 are arranged on the third insulation layer 8. The thickness of the reflection layer 3 may be in a range from 40 nm to 300 nm. The material of the reflection layer 3 may be metal with a high reflectivity, for example, silver or aluminium. The reflection layer 3 may be formed through a sputtering process.

Alternatively, the reflection layer 3 may be arranged above the first control unit 2. According to an embodiment of the present invention, the drain 24 of the first thin film transistor T1 is connected with the reflection layer 3 arranged above the first control unit 2. When the first thin film transistor T1 is switched on, the first voltage is applied on the reflection layer 3 so as to form a first electric field between the reflection layer 3 and the common electrodes 7. The second insulation layer 6 may be arranged on the reflection layer 3. In this case, the first control unit 2 does not comprise the first pixel electrode 25. According to another embodiment of the present invention, the first control unit 2 comprises the first thin film transistor T1 and the first pixel electrode 25, the reflection layer 3 is arranged on the first pixel electrode 25, and the second insulation layer 6 is arranged on the reflection layer.

Alternatively, the reflection layer 3 and the first control unit 2 may be arranged at the different sides of the underlayer 1. For example, the first control unit 2 may be arranged at the light-exiting side of the underlayer 1, and the reflection layer 3 is arranged at the light-entering side of the underlayer 1.

The glossy display substrate according to the embodiment is an array substrate.

In the glossy display substrate according to the embodiments of the present invention, the glossy display substrate is divided into the reflective area in which the reflection layer is arranged and the transmissive area. The polarization of light in the reflective area and the transmissive area is controlled by the first control unit and the second control unit which are arranged in the reflective area and the transmissive area respectively, and as a result, the normally-displayed image and the reflected image can not be seen simultaneously any more, thus avoiding the influence of the image resulting from specular reflection on the normally-displayed image, and then improving the display effect.

Figure 3:
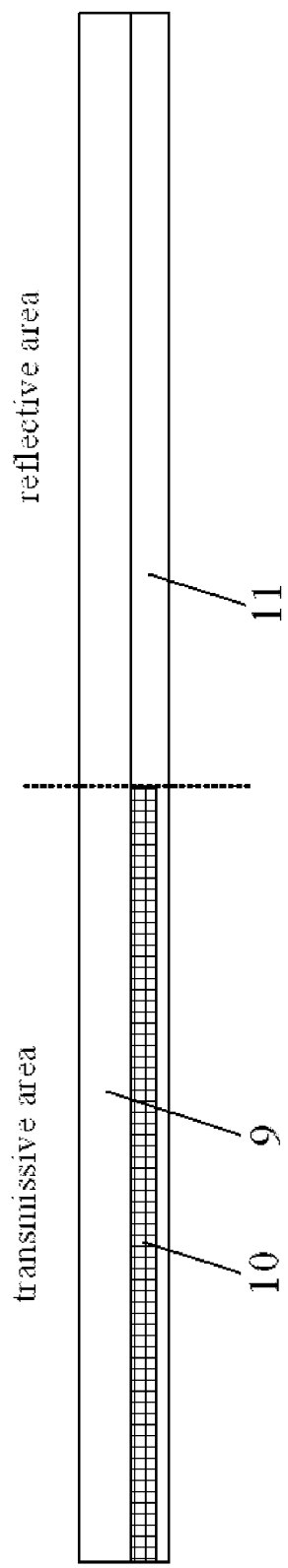
FIG. 3 is a schematic diagram of a structure of an opposite substrate according to an embodiment of the present invention.

FIG. 3 is a schematic diagram of a structure of an opposite substrate according to an embodiment of the present invention.

As shown in FIG. 3, the opposite substrate may also be correspondingly divided into a reflective area and a transmissive area. The opposite substrate comprises an underlayer 9, and a color matrix pattern 10 and a black matrix pattern (not shown) which are arranged on the underlayer 9. The black matrix pattern is arranged in both the reflective area and the transmissive area, and the color matrix pattern 10 is arranged in the transmissive area. For example, the color matrix pattern 10 may be a red matrix pattern, a green matrix pattern or a blue matrix pattern. No color matrix pattern is not arranged in the reflective area. It should be appreciated by a person skilled in the art that the position of the black matrix pattern may correspond to positions of the first thin film transistor T1 and the second thin film transistor T2 as well as the gate lines and the data lines on the glossy display substrate, and therefore, the black matrix pattern is not shown so as to avoid unnecessary confusion.

The opposite substrate may further comprise a flat layer 11 arranged on the color matrix pattern 10 to cover the whole underlayer 9.

The opposite substrate according to the embodiment is a color filter substrate.

Figure 4:
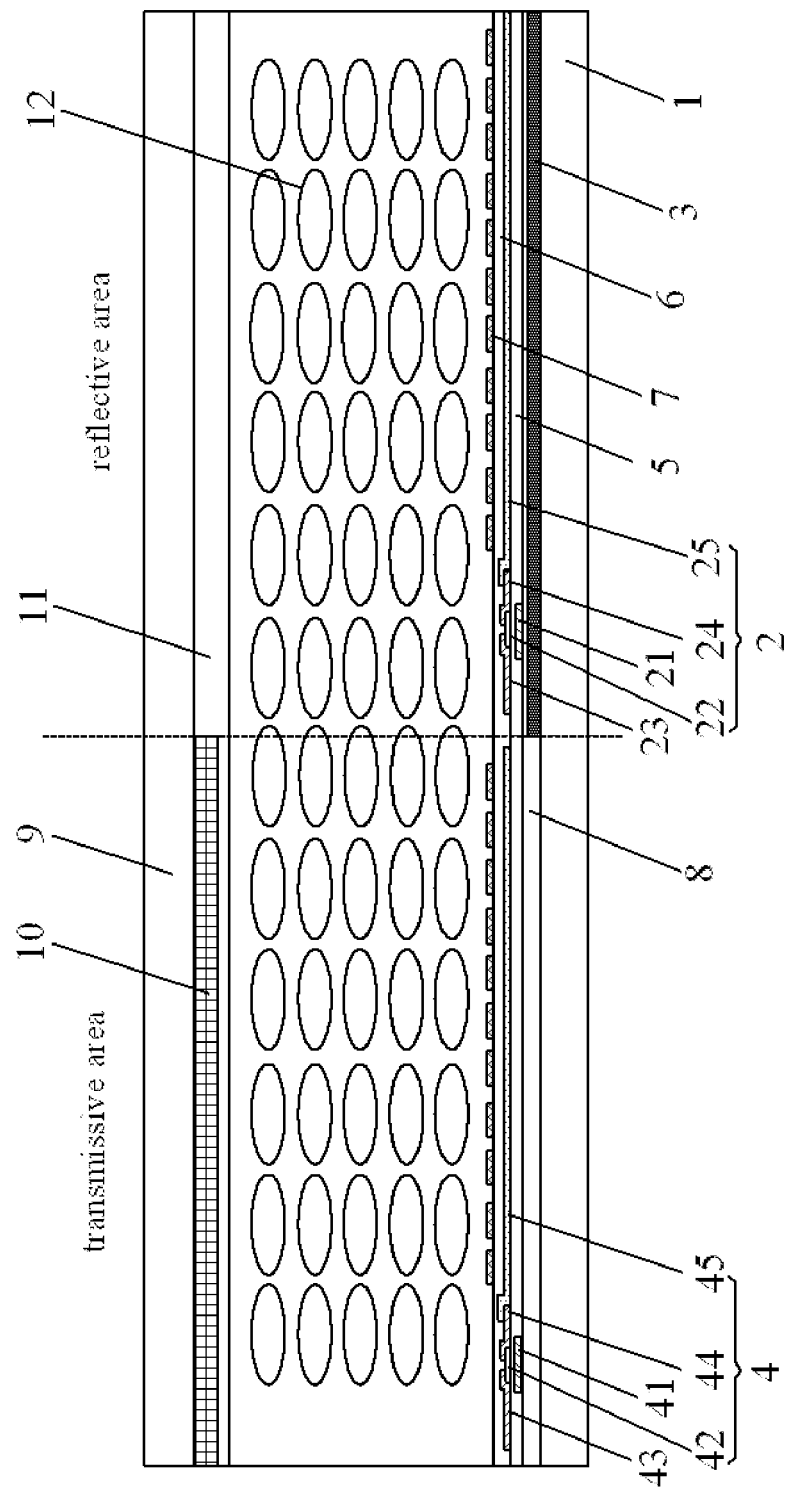
FIG. 4 is a schematic diagram of a structure of a glossy display apparatus according to an embodiment of the present invention.

FIG. 4 is a schematic diagram of a structure of a glossy display apparatus according to an embodiment of the present invention.

As shown in FIG. 4, the glossy display apparatus according to the embodiment of the present invention comprises a glossy display substrate (as shown in FIG. 1) and an opposite substrate (as shown in FIG. 3) which are oppositely arranged. Liquid crystals 12 are arranged between the glossy display substrate and the opposite substrate. According to the embodiment, the glossy display substrate is an array substrate, and the opposite substrate is a color filter substrate.

Figure 5:
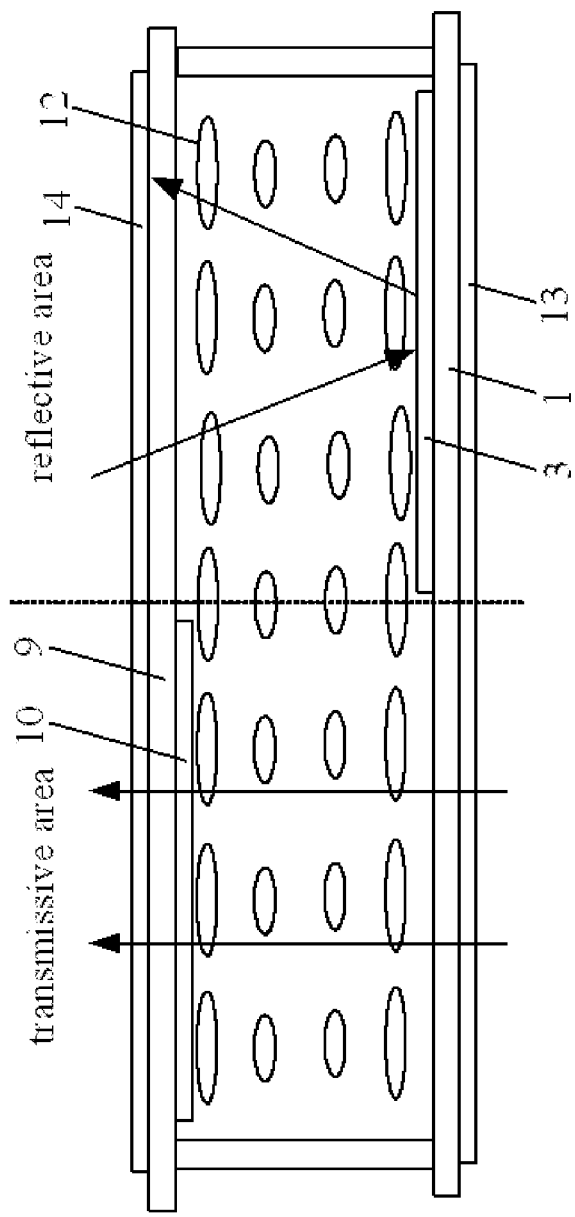
FIG. 5 is a schematic diagram illustrating a state that the glossy display apparatus shown in FIG. 4 is in a first display mode.
Figure 6:
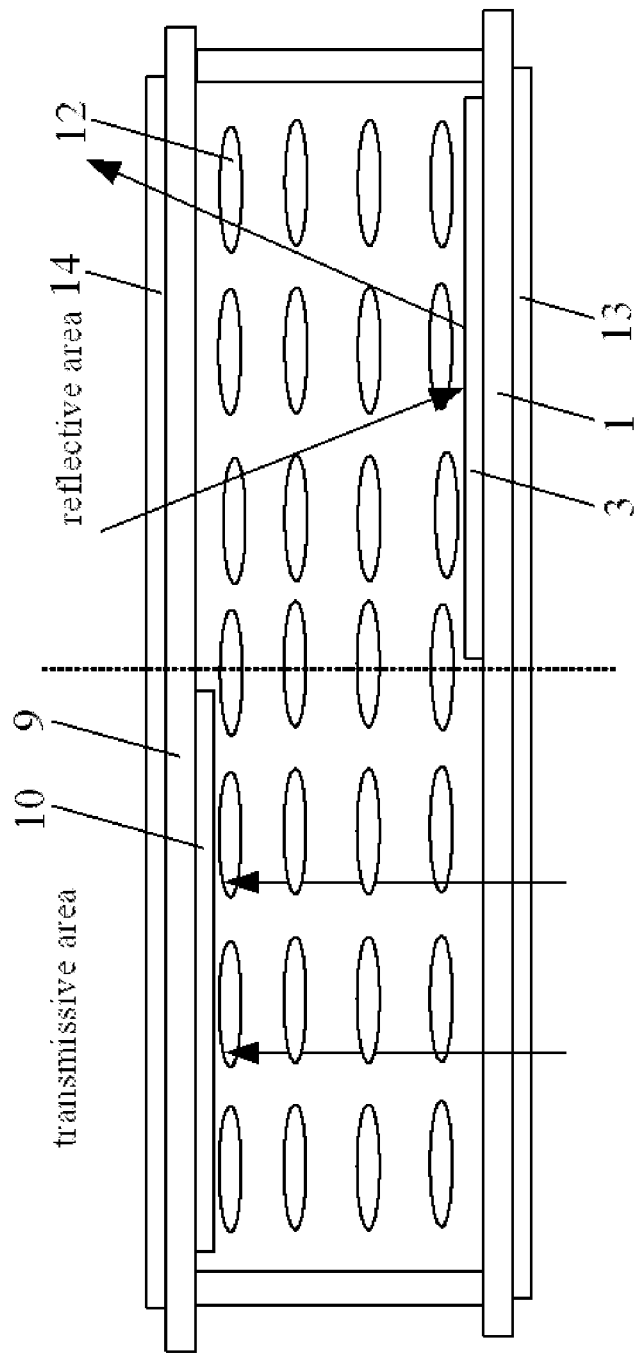
FIG. 6 is a schematic diagram illustrating a state that the glossy display apparatus shown in FIG. 4 is in a second display mode.

FIG. 5 is a schematic diagram illustrating a state that the glossy display apparatus shown in FIG. 4 is in a first display mode; and FIG. 6 is a schematic diagram illustrating a state that the glossy display apparatus shown in FIG. 4 is in a second display mode. As shown in FIGS. 5 and 6, a first polarizer 13 is arranged at the light-entering side of the glossy display substrate, and a second polarizer 14 is arranged at the light-exiting side of the opposite substrate. The polarization direction of the first polarizer 13 is vertical to that of the second polarizer 14. The display state of the glossy display apparatus according to the embodiment of the present invention is described in detail below in combination with FIG. 5 and FIG. 6.

Referring to FIGS. 1, 2 and 5, in case of normally displaying an image (that is, under the first display mode), the first thin film transistor T1 is switched on through a gate line, and a first voltage obtained from a data line is applied on the first pixel electrode 25 so as to form a first electric field between the first pixel electrode 25 and the common electrodes 7. The first electric field is capable of controlling the polarization direction of the reflected light generated by the reflection layer 3. Specifically, an incident light passing through the second polarizer 14 is irradiated on the reflection layer 3, and the reflection layer 3 is used for reflectings the incident light so as to generate a reflected light. The reflected light arrives at the second polarizer 14 after passing through the liquid crystals 12. The first electric field between the first pixel electrode 25 and the common electrodes 7 may enable the liquid crystals 12 to generate a phase delay of ¼ wavelength, and under the action of the liquid crystals 12, the polarization direction of the reflected light deviates from that of the incident light by 90 degrees, therefore, the reflected light is prevented from passing through the second polarizer 14, that is, the reflected light is prevented from exiting from the reflective area. Meanwhile, the second thin film transistor T2 is switched on through one a gate line, and a second voltage obtained from a data line is applied on the second pixel electrode 45 so as to form a second electric field between the second pixel electrode 45 and the common electrodes 7. The second electric field is capable of controlling the polarization direction of the light emitted from the backlight source. Specifically, the second electric field between the second pixel electrode 45 and the common electrodes 7 may enable the liquid crystals 12 to generate a phase delay of ¼ wavelength, and under the action of the liquid crystals 12, the polarization direction of the light transmitting through the polarizer 13 becomes the same as that of the second polarizer 14, therefore, the light emitted from the backlight source can pass through the second polarizer 14, that is, the light emitted from the backlight source exits from the transmissive area. Because the color matrix pattern 10 is arranged in the transmissive area of the opposite substrate, the light emitted from the backlight source sequentially passes through the color matrix pattern 10 and the second polarizer 14 to exit from the transmissive area, thus realizing normal image display.

Referring to FIGS. 1, 2 and 6, in case of using the display panel as a mirror surface (that is, under the second display mode), the first thin film transistor T1 is switched off through a gate line, and the second thin film transistor T2 is switched off through a gate line. No electric field is formed between the first pixel electrode 25 and the common electrodes 7. Incident light passing through the second polarizer 14 is irradiated on the reflection layer 3, and the reflection layer 3 reflects the incident light to generate reflected light. The reflected light arrives at the second polarizer 14 after passing through the liquid crystals 12 and exits from the reflective area. Meanwhile, no electric field is formed between the second pixel electrode 45 and the common electrodes 7. Because the polarization direction of the light transmitting through the first polarizer 13 is vertical to that of the second polarizer 14, the light emitted from the backlight source is prevented from exiting from the transmissive area, thus realizing use of the glossy display apparatus as the mirror surface to display the reflected image.

Although in the above embodiment, the opposite substrate is shown as a color filter substrate, according to another embodiment of the present invention, the glossy display substrate may be a color filter on array (COA) substrate. In this case, the opposite substrate may be a transparent substrate, for example, a glass substrate or a sapphire substrate. According to the current embodiment, the glossy display substrate may further comprise a black matrix pattern arranged in the reflective area and the transmissive area, and a color matrix pattern arranged in the transmissive area.

In the glossy display apparatus according to the embodiments of the present invention, the glossy display substrate is divided into a the reflective area in which the reflection layer is arranged and the transmissive area. The polarization of light in the reflective area and the transmissive area is controlled by the first control unit and the second control unit which are arranged in the reflective area and the transmissive area respectively, and as a result, the normally-displayed image and the reflected image can not be seen simultaneously any more, thus avoiding the influence of the image resulting from specular reflection on the normally-displayed image, and then improving the display effect.

It may be understood that, the above-described embodiments are merely exemplary implementations adopted for illustrating the principle of the present invention, but the present invention is not limited thereto. Various variations and improvements could be made by those of ordinary skill in the art without departing from the spirit and essence of the present invention, and these variations and improvements are still deemed as the protection scope of the present invention.

The invention claimed is:

1. A glossy display substrate, which is arranged on a backlight source and divided into reflective area and transmissive area, wherein the glossy display substrate comprises an underlayer as well as a first control unit, a reflection layer and a second control unit arranged above the underlayer, the first control unit and the reflection layer are arranged in the reflective area, and the second control unit is arranged in the transmissive area, and wherein, the reflection layer is used for reflecting incident light to generate reflected light, the first control unit is used for controlling a polarization direction of the reflected light so as to prevent the reflected light from exiting from the reflective area under a first display mode, and allow the reflected light to exit from the reflective area under a second display mode, and the second control unit is used for controlling a polarization direction of light emitted from the backlight source so as to prevent the light emitted from the backlight source from exiting from the transmissive area under the second display mode, and allow the light emitted from the backlight source to exit from the transmissive area under the first display mode, wherein the glossy display substrate further comprises a black matrix pattern arranged in the reflective area and the transmissive area, and a color matrix pattern arranged in the transmissive area.

2. The glossy display substrate according to claim 1, further comprising common electrodes formed above the underlayer.

3. The glossy display substrate according to claim 2, wherein the first control unit comprises a first thin film transistor and a first pixel electrode connected with the first thin film transistor, under the first display mode, the first thin film transistor is switched on, and a first voltage is applied on the first pixel electrode so as to form a first electric field between the first pixel electrode and the common electrodes; and under the second display mode, the first thin film transistor is switched off.

4. The glossy display substrate according to claim 2, wherein the second control unit comprises a second thin film transistor and a second pixel electrode connected with the second thin film transistor, under the first display mode, the second thin film transistor is switched on, and a second voltage is applied on the second pixel electrode so as to form a second electric field between the second pixel electrode and the common electrodes; and under the second display mode, the second thin film transistor is switched off.

5. The glossy display substrate according to claim 1, wherein the reflection layer is arranged on the underlayer, and the first control unit is arranged above the reflection layer.

6. The glossy display substrate according to claim 1, wherein the first control unit is arranged on the underlayer, and the reflection layer is arranged above the first control unit.

7. The glossy display substrate according to claim 1, wherein the reflection layer and the first control unit are arranged at different sides of the underlayer respectively.

8. The glossy display substrate according to claim 1, wherein a thickness of the reflection layer is in a range from 40 nm to 300 nm.

9. A glossy display apparatus, comprising a glossy display substrate and an opposite substrate which are oppositely arranged, wherein the glossy display substrate comprises the glossy display substrate according to claim 1.

10. The glossy display apparatus according to claim 9, wherein the glossy display substrate further comprises common electrodes formed above the underlayer.

11. The glossy display apparatus according to claim 10, wherein the first control unit comprises a first thin film transistor and a first pixel electrode connected with the first thin film transistor, under the first display mode, the first thin film transistor is switched on, and a first voltage is applied on the first pixel electrode so as to form a first electric field between the first pixel electrode and the common electrodes; and under the second display mode, the first thin film transistor is switched off.

12. The glossy display apparatus according to claim 10, wherein the second control unit comprises a second thin film transistor and a second pixel electrode connected with the second thin film transistor, under the first display mode, the second thin film transistor is switched on, and a second voltage is applied on the second pixel electrode so as to form a second electric field between the second pixel electrode and the common electrodes; and under the second display mode, the second thin film transistor is switched off.

13. The glossy display apparatus according to claim 9, wherein the reflection layer is arranged on the underlayer, and the first control unit is arranged above the reflection layer.

14. The glossy display apparatus according to claim 9, wherein the first control unit is arranged on the underlayer, and the reflection layer is arranged above the first control unit.

15. The glossy display apparatus according to claim 9, wherein the reflection layer and the first control unit are arranged at different sides of the underlayer respectively.

16. The glossy display apparatus according to claim 9, wherein a thickness of the reflection layer is in a range from 40 nm to 300 nm.

17. The glossy display apparatus according to claim 9, wherein
the opposite substrate is a transparent substrate.

18. A glossy display apparatus, comprising a glossy display substrate and an opposite substrate which are oppositely, wherein, the glossy display substrate is arranged on a backlight source and divided into reflective area and transmissive area, wherein the glossy display substrate comprises an underlayer as well as a first control unit, a reflection layer and a second control unit arranged above the underlayer, the first control unit and the reflection layer are arranged in the reflective area, and the second control unit is arranged in the transmissive area, and wherein, the reflection layer is used for reflecting incident light to generate reflected light, the first control unit is used for controlling a polarization direction of the reflected light so as to prevent the reflected light from exiting from the reflective area under a first display mode, and allow the reflected light to exit from the reflective area under a second display mode, and the second control unit is used for controlling a polarization direction of light emitted from the backlight source so as to prevent the light emitted from the backlight source from exiting from the transmissive area under the second display mode, and allow the light emitted from the backlight source to exit from the transmissive area under the first display mode, and wherein, a black matrix pattern is arranged on areas of the opposite substrate corresponding to the reflective area and the transmissive area of the glossy display substrate, and a color matrix pattern is arranged on the area of the opposite substrate corresponding to the transmissive area of the glossy display substrate.

* * * * *